(12) United States Patent
Nagamatsu

(10) Patent No.: US 7,702,890 B2
(45) Date of Patent: Apr. 20, 2010

(54) INFORMATION PROCESSING APPARATUS AND PROGRAM

(75) Inventor: Tatsuo Nagamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 1309 days.

(21) Appl. No.: 10/860,733

(22) Filed: Jun. 3, 2004

(65) Prior Publication Data

US 2004/0254986 A1 Dec. 16, 2004

(30) Foreign Application Priority Data

Jun. 5, 2003 (JP) ............................ P2003-160878

(51) Int. Cl.
*G06F 15/177* (2006.01)
(52) U.S. Cl. ................................ 713/1; 713/2; 713/100
(58) Field of Classification Search ...................... 713/1, 713/2, 100
See application file for complete search history.

(56) References Cited

U.S. PATENT DOCUMENTS

| | | | | |
|---|---|---|---|---|
| 6,226,659 | B1 * | 5/2001 | Wong et al. | 715/209 |
| 2001/0034711 | A1 * | 10/2001 | Tashenberg | 705/52 |
| 2003/0191752 | A1 * | 10/2003 | Fairweather | 707/3 |
| 2005/0114453 | A1 * | 5/2005 | Hardt | 709/206 |

OTHER PUBLICATIONS

Tenohira Nadeshiko, "Gain mastership by lessons and practices! For the mastery of standard software: Palmware school", Palm Magazine, vol. 11, May 23, 2002, cover page and pp. 110-111.
M. Hirose, et al., "Now, Palm is hot", Palm Magazine, vol. 5, May 24, 2001, cover page and pp. 20-29.
M. Hirose, et al., "Way too good for only a backup! Let's carry around with Palm: Advantageous use of a memory card", Palm Magazine, vol. 15, Jan. 24, 2003, cover page and pp. 74-75.

* cited by examiner

*Primary Examiner*—Tse Chen
(74) *Attorney, Agent, or Firm*—Oblon, Spivak, McClelland, Maier & Neustadt, L.L.P.

(57) ABSTRACT

A information processing apparatus and a program are disclosed which make it possible to perform processing of an application on a secondary memory apparatus without the necessity for alteration to an OS incorporated in the information processing apparatus. The information processing apparatus includes a central processing unit, a main storage apparatus and a secondary storage apparatus, and starts and executes a program on the main storage apparatus under the control of an OS incorporated therein. Even where the OS does not provide a function of handling an application on the secondary storage apparatus, a first program for performing supporting for copying the application into the main storage apparatus and executing the application is provided in the mains storage apparatus. A second program including place information of the application on the secondary storage apparatus and a starting code for starting the first program is produced on the first storage apparatus. A launcher can operate the second program similarly to the other applications on the main storage apparatus.

9 Claims, 6 Drawing Sheets

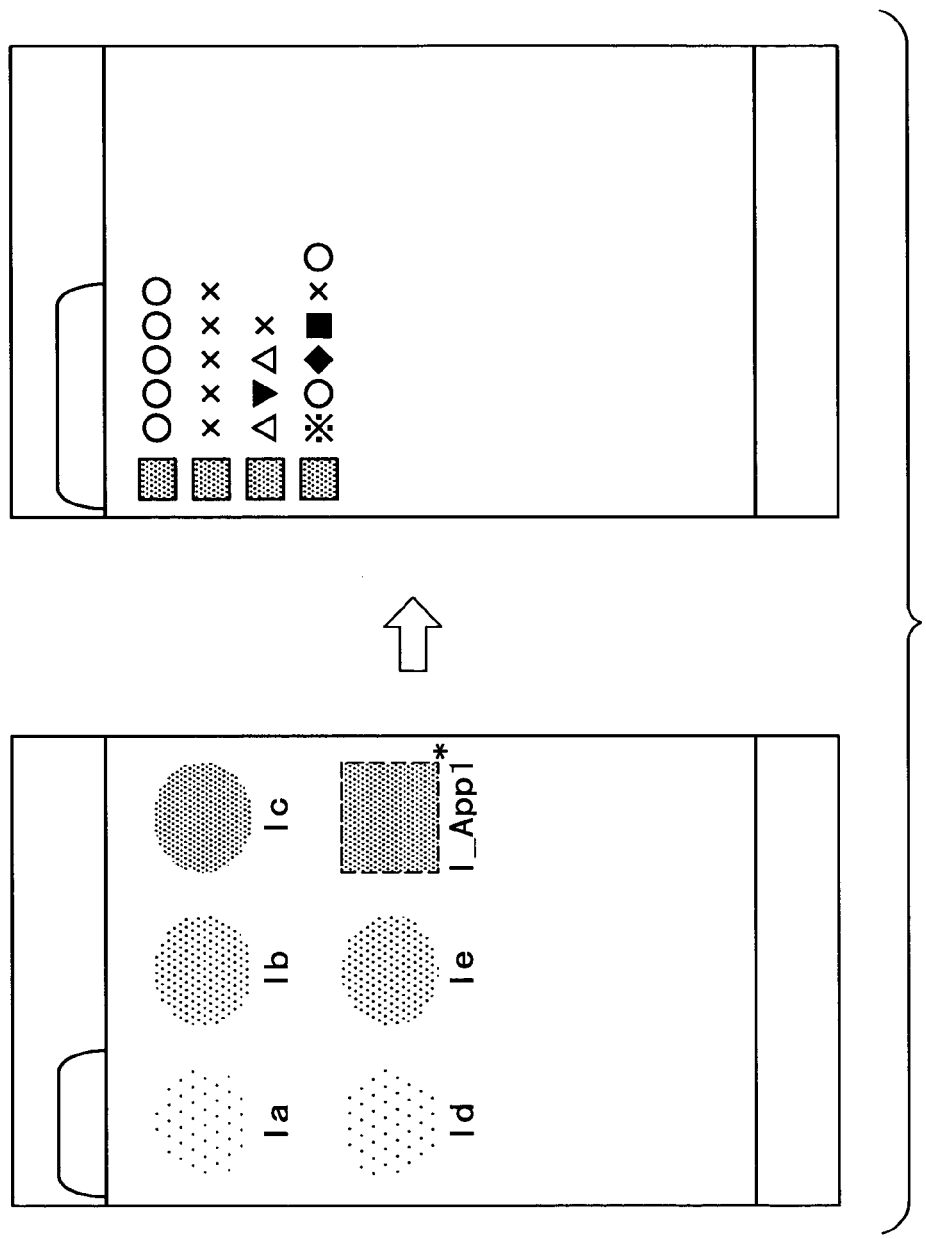

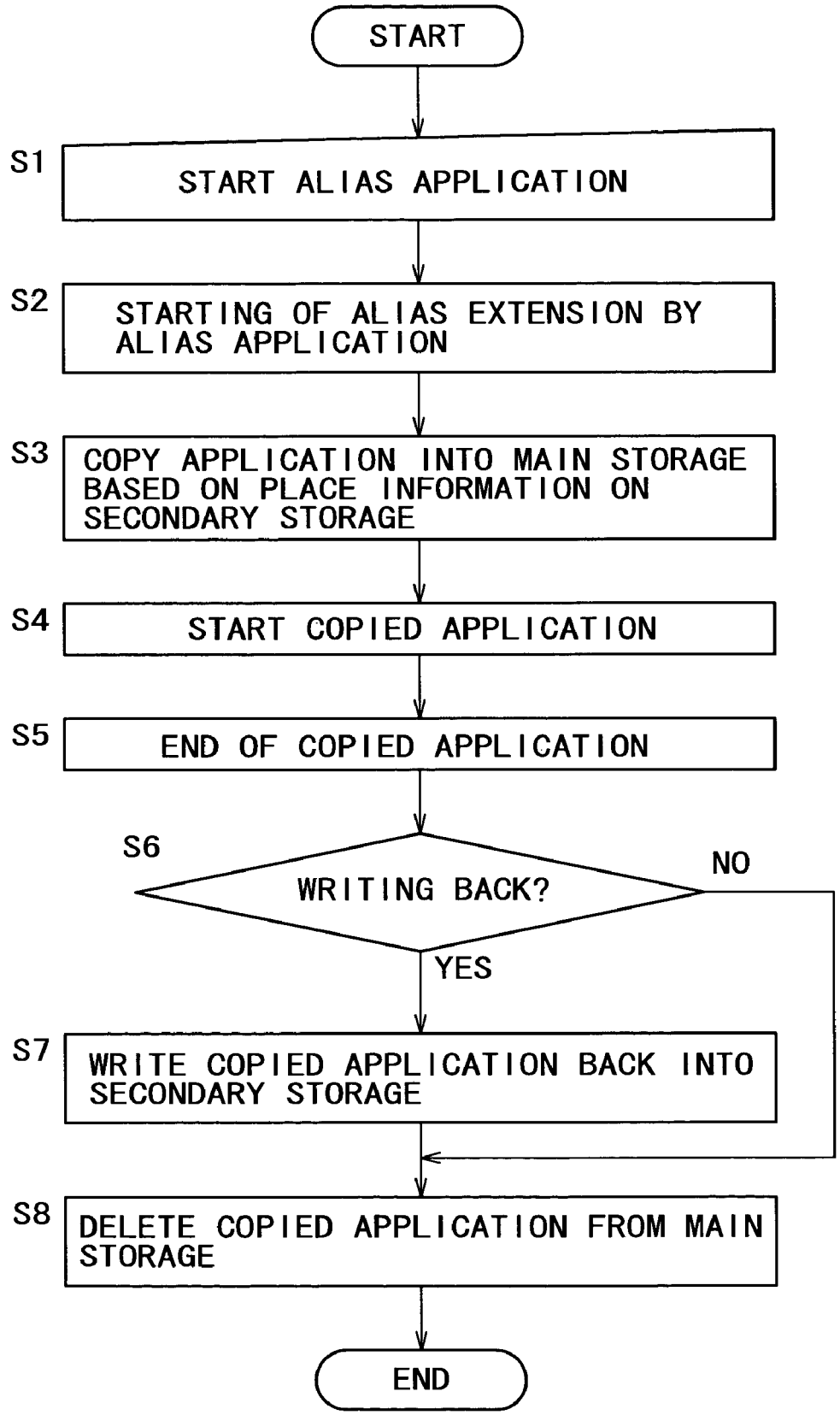

INFORMATION PROCESSING APPARATUS AND PROGRAM

BACKGROUND OF THE INVENTION

This invention relates to a technique for making it possible for an information processing apparatus and a program, by which an application stored in a secondary storage apparatus is copied into a main storage apparatus and executed, to perform processing of an application on the secondary storage apparatus without involving extensive modification to an operating system or an application starting program (launcher).

An operating system (hereinafter referred to simply as "OS") incorporated in computer apparatus provides various functions necessary for processing of applications. Where an apparatus is configured such that an OS therein does not provide a function of handling an application on a secondary memory (flash memory, optical disk, network server or the like) like a PDA (Personal Digital Assistance), it is necessary to take a countermeasure for causing the application to be read into a main storage apparatus and executed. Therefore, for example, another application called launcher for starting the application supports execution of the application on the secondary memory apparatus. In short, the launcher copies an application on the secondary storage memory designated by a user into the main storage apparatus and then starts the application.

However, conventional apparatus have a problem in that, as viewed from the OS, it is difficult to equivalently handle an application on the main storage apparatus and another application on the secondary storage apparatus.

For example, where there is no necessity to take restrictions on the storage capacity of the main storage apparatus into consideration, it is possible to copy all applications on the secondary storage apparatus into the main storage apparatus first and then designate and execute a desired one of the applications. However, the storage area is a limited source, and particularly to apparatus of the portable type, excessive increase of the application size makes a problem. Therefore, an application which cannot be placed into the main storage apparatus is stored into the secondary storage apparatus and started from the launcher as occasion demands. Therefore, the application just mentioned and an application on the main storage apparatus are distinguished as applications of different categories in management from each other. Further, where it becomes necessary to modify the launcher in order to cope with a new application or the like or change an application set or for some other purpose or where another launcher is to be produced from the launcher, it is necessary to include codes for handling an application on the secondary storage apparatus (codes for copying into the main storage apparatus, for starting of the application and so forth) into the launchers. This gives rise to problems that it has an influence on the storage capacity of the main storage apparatus and that the convenience to the user degrades.

Naturally it is possible to change the OS itself so that applications on the main storage apparatus and applications on the secondary storage apparatus can be handled equivalently to each other. However, this compels to substantially modify design specifications.

SUMMARY OF THE INVENTION

It is an object of the present invention to provide an information processing apparatus and a program which make it possible to perform processing of an application on a secondary memory apparatus without the necessity for alteration to an operating system incorporated in the information processing apparatus.

In order to attain the object described above, according to an aspect of the present invention, there is provided an information processing apparatus, including a central processing unit for interpreting and executing instructions of a program, a main storage apparatus, and a secondary storage apparatus or an interface for connection to a secondary storage apparatus. A program on the main storage apparatus is started and executed under the control of an operating system incorporated in the information processing apparatus. The main storage apparatus has a first program stored therein for performing supporting for copying an application on the secondary storage apparatus into the main storage apparatus and executing the application. A second program including place information of the application on the second storage apparatus and a starting code for starting the first program is produced in the main storage apparatus by the first program.

According to another aspect of the present invention, there is provided a program for use with an information processing apparatus, which includes a central processing unit for interpreting and executing instructions of a program, a main storage apparatus, and a secondary storage apparatus or an interface for connection to a secondary storage apparatus, for performing supporting for copying any of applications on the secondary storage apparatus into the main storage apparatus and executing the application. The program includes a step of automatically producing, for each of the applications, a program of a small size including place information of the application on the second storage apparatus and a starting code for starting the program and causing the produced program to exist in the main storage apparatus.

In the information processing apparatus and the program, an application on the secondary storage apparatus can be executed after it is copied into the main storage apparatus based on a program produced in the main storage apparatus by the first program. Then, since the second program on the main storage apparatus does not include a code for causing the application on the secondary storage apparatus to be started after it is copied into the main storage apparatus, it is small in size and has a reduced influence on reduction of the storage capacity of the main storage apparatus.

With the information processing apparatus and the program, an application on the second storage apparatus can be handled equivalently to an application on the main storage apparatus without involving alteration to the operating system and so forth. Besides, this does not give rise to such an evil effect that the storage capacity of the main storage apparatus becomes tight or the convenience to the user degrades.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a schematic view illustrating an example of a display screen; and

FIG. 6 is a flow chart illustrating an example of processing by the information apparatus of FIG. 1.

DESCRIPTION OF THE PREFERRED EMBODIMENT

The present invention provides an information processing apparatus in which an OS is incorporated and a program for use with the information processing apparatus. The information processing apparatus and the program make it possible for a user to use a desired application without being aware of a location of the application, that is, whether the application is on a secondary storage apparatus or on a main storage apparatus. This can be achieved without alteration to the OS and so forth while the upward compatibility is maintained and the convenience to the user is improved. The present invention can be applied, for example, to portable computers, PDAs, mobile communication terminal equipments, various video apparatus, various image pickup apparatus and so forth.

Figure 1:
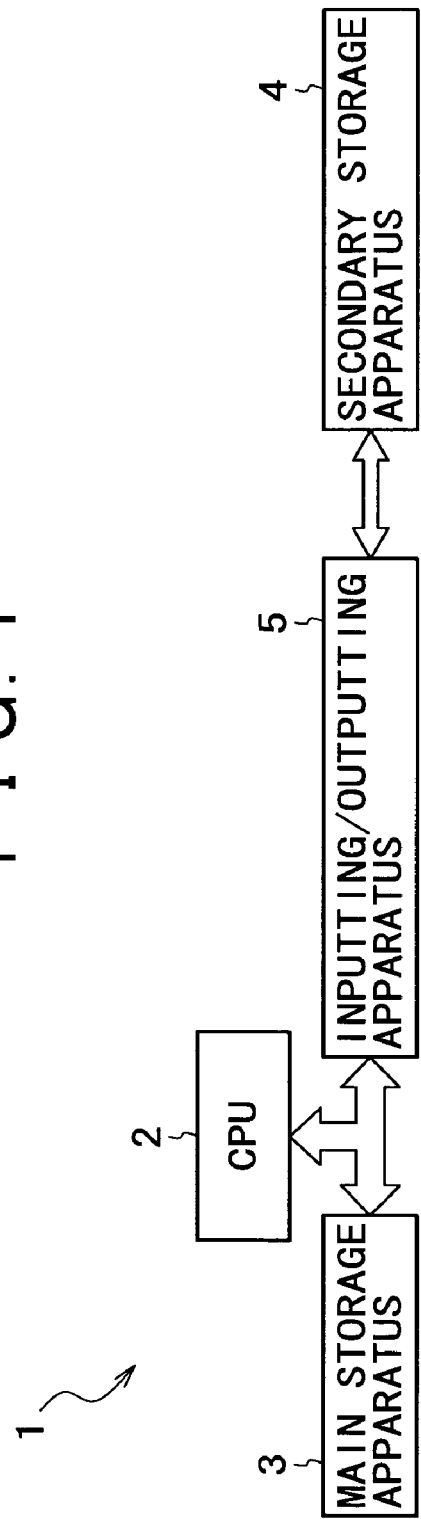
FIG. 1 is a block diagram illustrating a basic configuration of an information processing apparatus according to the present invention.

Referring first to FIG. 1, there is shown an information processing apparatus to which the present invention is applied. In FIG. 1, only basic components of the information processing apparatus are shown.

The information processing apparatus 1 includes a central processing unit (hereinafter referred to simply as CPU) 2 for interpreting and executing an instruction of a program, a main storage apparatus or main memory 3, and a secondary storage apparatus or auxiliary storage apparatus 4 or an inputting/outputting (I/O) apparatus 5 to which such a secondary storage apparatus 4 as just mentioned is connected.

The CPU 2 is connected to the main storage apparatus 3 and the inputting/outputting apparatus 5 by a bus, and the inputting/outputting apparatus 5 is connected to the secondary storage apparatus 4.

The main storage apparatus 3 is formed from a device which is shorter in access time when compared with the secondary storage apparatus 4 (for example a semiconductor memory such as an SDRAM).

The secondary storage apparatus 4 is formed from a device which is long in access time but is low in cost when compared with the main storage apparatus 3 such as a flash memory. It is to be noted that the inputting/outputting apparatus 5 connected to the secondary storage apparatus 4 forms an interface for connection to the secondary storage apparatus 4, and the following configurations are available.

1. A configuration wherein the secondary storage apparatus 4 is formed from a memory medium such as a card type memory or a small size hard disk and can be loaded into or unloaded from the information processing apparatus when it is used;

2. Another configuration wherein a storage medium such as a magnetic disk or an optical disk for use with the secondary storage apparatus 4 can be used exchangeably; and 3. A further configuration wherein the secondary storage apparatus 4 is formed as a storage device on a network or as a storage device which is provided in a separate information processing apparatus such that data can be transferred by radio transmission or by wire transmission and the inputting/outputting apparatus 5 serves as a communication interface for the devices.

Description is given of a case where a PDA is used as an example. For example, in order to make it possible for a user to immediately use an application without performing such a complicated work as installation after the product is purchased, all applications may be stored into a ROM (Read Only Memory) area or may be stored into a flash memory or the like so that they may cope with upgrading in the future. However, in order to cope with increase in scale, diversification and so forth of applications, it is preferable to use a configuration wherein a less expensive memory such as an extension card is used for the secondary storage apparatus 4 to store the applications and the user can use a desired one of the applications by an operation of an icon or the like.

Where the information processing apparatus 1 does not include the secondary storage apparatus 4, it may be configured such that the user can utilize a communication function to receive and use a desired application as occasion demands.

It is to be noted that, in FIG. 1, such inputting operation apparatus as a keyboard and a pointing device (pen type inputting device) and a display apparatus (liquid crystal type display unit) necessary for user interface and various apparatus equipped for the information processing apparatus 1 such as a camera and a sound processing apparatus are omitted for simplified illustration.

An OS for providing functions necessary for execution processing of applications is incorporated in the information processing apparatus 1, and in order for the CPU 2 to execute an application under the control of the OS, the application must exist on the main storage apparatus 3. It is assumed here that the OS cannot cause the applications stored in the secondary storage apparatus 4 to be loaded into the main storage apparatus and executed.

Figure 2:
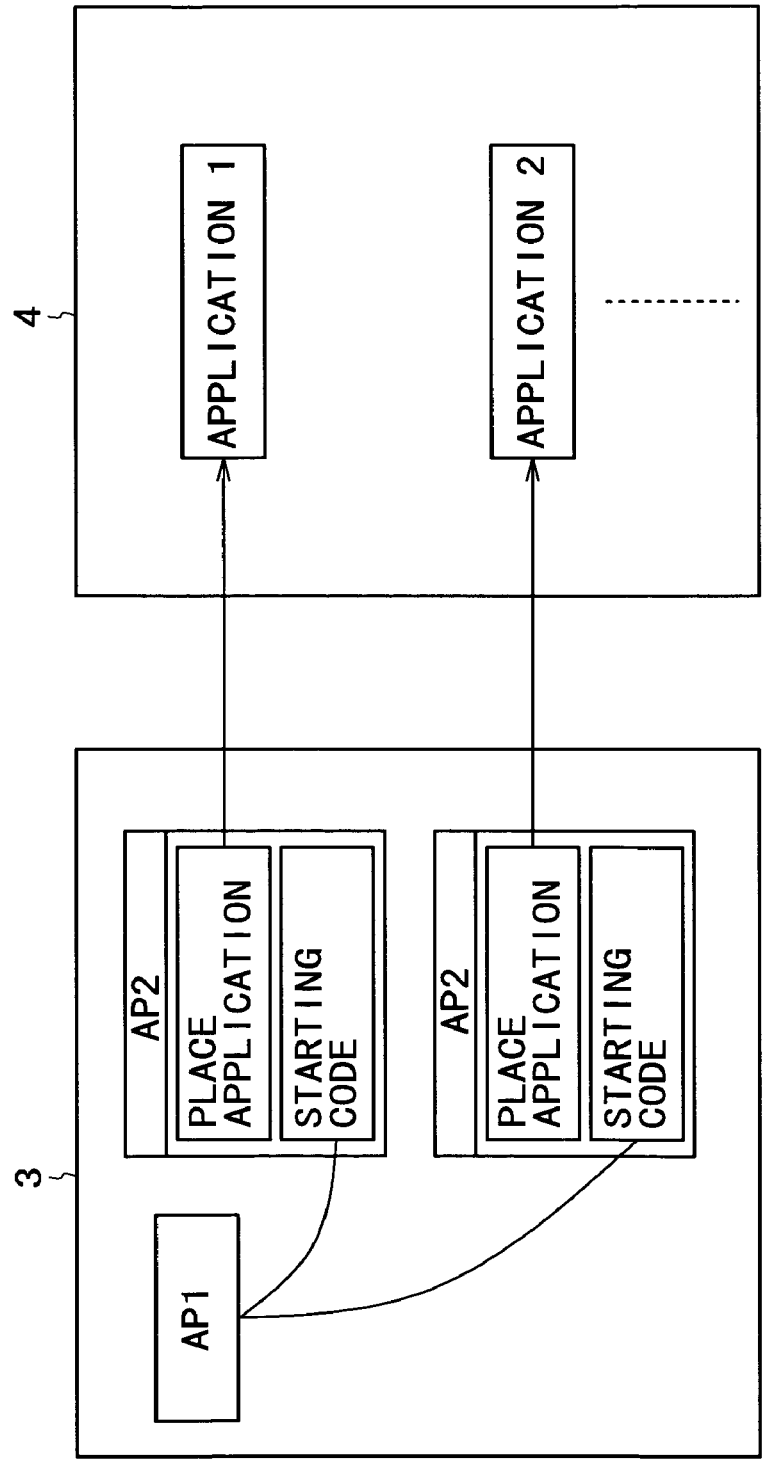
FIG. 2 is a block diagram illustrating a program according to the present invention.

FIG. 2 illustrates a relationship between programs existing on the main storage apparatus 3 and applications (programs) existing on the secondary storage apparatus 4.

Referring to FIG. 2, a first program (hereinafter referred to as first program AP1) exists on the main storage apparatus 3. The first program AP1 performs supporting for copying an application on the secondary storage apparatus 4 into the main storage apparatus 3 and executing the application.

A second program (hereinafter referred to as second program AP2) or programs may be produced on the main storage apparatus 3 by the first program AP1. Each of the second programs AP2 includes place information (an absolute path or the like) or location information (a URL: Uniform Resource Locator or the like) of an application on the secondary storage apparatus 4 and a starting code for starting the first program AP1. As a configuration relating to the second programs, a configuration wherein a common starting code is used and location information for individual applications existing on the secondary storage apparatus 4 is collectively included in a database and another configuration wherein second programs AP2 individually corresponding to applications (refer to "Application 1", "Application 2", . . . shown in FIG. 2) existing on the secondary storage apparatus 4 are produced on the main storage apparatus 3 or, where such second programs AP2 are already prepared on the secondary storage apparatus 4, they are copied into the main storage apparatus 3 are available. However, where the facility in management (addition, updating or the like) is taken into consideration, the latter is preferable.

When one of the second programs AP2 is started on the OS, the starting code included in the program is processed and the first program AP1 is started. Then, the first program AP1 copies, based on the place information or location information included in the second program AP2, an application on the secondary storage apparatus 4 indicated by the information into the main storage apparatus 3 and then causes the application to be started. Consequently, even where the OS does not provide a function of directly handling an application on the secondary storage apparatus 4, an application on the secondary storage apparatus 4 can be executed based on the AP1 and AP2.

It is to be noted that the second program AP2 started by the launcher designates the place information or the like included therein as an argument to start a first program AP1, and consequently, the first program AP1 can specify the application on the secondary storage apparatus 4 and perform processing of the application (the first program AP1 is not directly concerned with the location of the application).

Then, after the processing of the application started by the first program AP1 ends, the application is deleted from the main storage apparatus 3 by the first program AP1, that is, the memory area occupied by the application till then is released.

Figure 3:
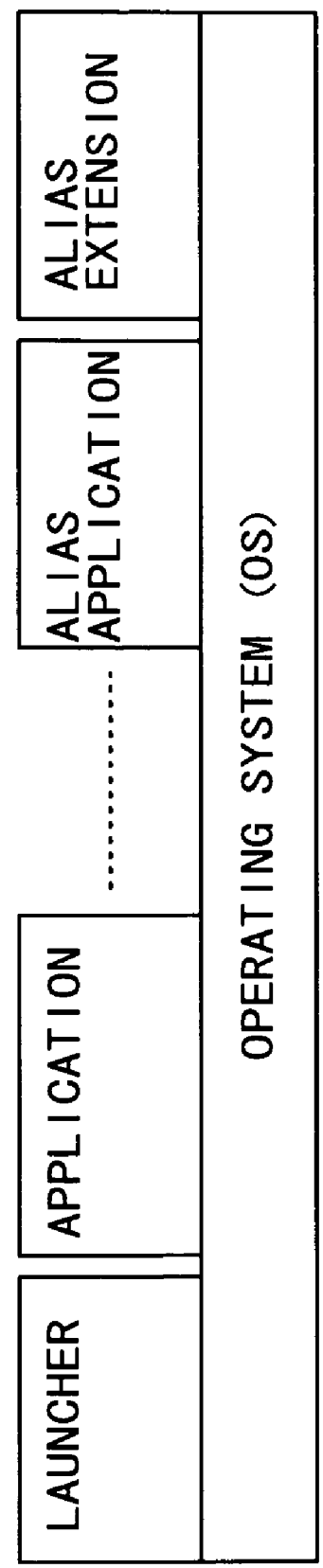
FIG. 3 is a diagrammatic view illustrating a hierarchical structure of software as viewed from an OS.

FIG. 3 illustrates a concept of a hierarchical structure of software as viewed from the OS. Various pieces of software individually have the following meanings:

Application is a module including instructions (codes) providing various functions to operate on the OS, data, resources such as UI (User Interface) information (for example, an icon) and so forth;

Launcher is an application for starting another application on the main storage apparatus 3;

"Alias Extension" is an application which is started from an "Alias application" and performs supporting for executing an application on the secondary storage apparatus 4; and "Alias application" is an application which includes place information of an application on the secondary storage apparatus 4 and a small code for starting the "Alias Extension".

It is to be noted that the "Alias Extension" corresponds to the first program AP1 and the "Alias application" corresponds to a second program AP2, and they are applications on the main storage apparatus 3.

For example, if it is assumed that the Alias Extension and an Alias application do not exist on the main storage apparatus, then where an application on the secondary storage apparatus does not exist on the main storage apparatus, it is necessary to start the application after the application is copied into the main storage apparatus with the support of the launcher. In contrast, the Alias application started by the launcher calls the Alias Extension and urges the same to copy an application on the secondary storage apparatus indicated by the place information on the main storage apparatus and execute the application. Consequently, when viewed from the OS, the Alias application is handled equivalently to an application on the main storage apparatus 3, or in other words, an application on the secondary storage apparatus can be processed similarly to an application on the main storage apparatus.

It is to be noted that, for example, where a removable memory medium is used as the secondary storage apparatus 4, the Alias application is preferably produced automatically by the Alias Extension when the memory medium is loaded into a slot. This makes it possible to obtain a state which can be regarded as if a link to an application on the secondary storage apparatus 4 were extended and makes it possible to operate, as viewed from the user, the application without causing the user to be aware of distinction between the main storage apparatus 3 and the secondary storage apparatus 4.

Further, where it is taken into consideration that production of an Alias application is placed under the control of the Alias Extension and that, unless the Alias Extension is called from an Alias Application, execution of the application on the secondary storage apparatus 4 is not supported, it is preferable to include the Alias Extension in a ROM, that is, to store it so as not to disappear from the main storage apparatus or to make it possible to load it into the main storage apparatus to restore it even if it is erased.

Figure 4:
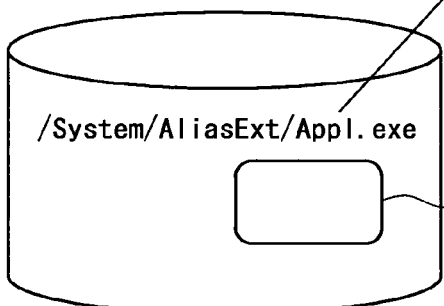
FIG. 4 is a diagrammatic view illustrating operation of an application program (Alias Extension)

FIG. 4 illustrates operation of the Alias Extension. Referring to FIG. 4, the Alias Extension includes an instruction code 6 and a starting code 7.

First, for example, upon starting of the system or upon mounting of the secondary storage apparatus 4 or the like, the Alias Extension lists up applications existing at a particular place on the secondary storage apparatus 4. Then, the Alias Extension dynamically produces Alias applications corresponding to the applications on the main storage apparatus 3.

Each Alias application includes place information of the application on the secondary storage apparatus 4 (in the example illustrated in FIG. 4, the place information is "System/AliasExt/Appl.exe" and includes the name of an execution file of the application), and a small code (starting code) 8 for starting the Alias Extension. It is to be noted that the starting code is produced by copying the starting code 7 prepared in advance as a resource separately from the execution code of the Alias Extension in the inside of the Alias Extension.

Further, upon unmounting of the secondary storage apparatus 4 or the like, the Alias Extension searches and deletes Alias applications existing on the main storage apparatus 3.

Alias applications are handled similarly to the applications on the main storage apparatus 3 as described hereinabove and can be started from the launcher by an operation of an icon or the like by the user.

FIG. 5 illustrates an example of a display screen. Referring to FIG. 5, an icon display screen of the launcher is shown on the left side while a display screen of applications to be started by Alias applications is shown on the right side.

Icons denoted by Ia to Ie on the icon display screen represent the applications on the main storage apparatus 3. Further, the remaining icon displayed distinctly by applying a mark "*" on the right shoulder of "I_Appl" represents an Alias application produced by the Alias Extension.

The user would select the icon of one of the Alias applications. In particular, for example, the user would use a pen for exclusive use or the like to depress the display area of the icon. In response to the selection, the Alias application is started and the Alias Extension is called, and then an application on the secondary storage apparatus 4 is started (refer to the display screen on the right side).

It is to be noted that the Alias Extension is not displayed on the screen, or in other words, the Alias Extension is provided with a confidential attribute.

FIG. 6 is a flow chart illustrating a flow of processes of the information processing apparatus described hereinabove.

Step S1: An Alias application is started.

Step S2: The Alias Extension is started by the Alias application.

Step S3: An application on the secondary storage apparatus 4 is copied into the main storage apparatus 3 based on place information of the Alias application.

Step S4: The application copied is started.

Step S5: The copied application ends.

Step S6: The necessity for writing of the copied application back into the secondary storage apparatus 4 is discriminated. If the writing is necessary, then the processing advances to step S7, but if the writing is not necessary, then the processing advances to step S8.

Step S7: The copied application is written back into the secondary storage apparatus 4.

Step S8: The copied application is deleted from the main storage apparatus 3.

The Alias application started by the launcher starts the Alias Extension using place information of the application on the secondary storage apparatus 4 as an argument. Then, the Alias Extension copies, based on the place information received as an argument, the application on the secondary storage apparatus 4 into the main storage apparatus 3 and causes the copied application to be started. At a point of time at which the application ends, the Alias Extension deletes the copied application and a relating file or files (temporary file and so forth) from the main storage apparatus 3. However, if the application of an object of the deletion has been changed from the corresponding application on the secondary storage apparatus by changing of data and so forth, the changed application is written back into the secondary storage apparatus 4 and thereafter deleted from the main storage apparatus 3. It is to be noted that the timing of the deletion is, for example, the timing at which calling of a next application ends.

According to the configuration described above, the following advantages can be anticipated.

1. An application on the secondary storage apparatus can be processed by the Alias Extension without changing the OS or the launcher for starting an application.

2. Since an Alias application is produced dynamically by the Alias Extension, the launcher can operate the Alias application in a similar manner to the other applications on the main storage apparatus.

3. Since an Alias application (application including place information of an application on the secondary storage apparatus and a small code for starting the Alias Extension) is utilized, the user or the OS need not be concerned with the location of an application. For example, the user need not be aware of whether an application exits on the mains storage apparatus or on the secondary storage apparatus.

4. Since a starting code for the Alias Extension included in an Alias application is produced by the Alias Extension and the Alias application is automatically produced by the Alias Extension, there is no possibility to damage the convenience to the user and so forth.

5. An application which cannot be stored in the main storage apparatus any more or an application which is not used very frequently can be managed in a state wherein they are stored in the secondary storage apparatus. Instead of them, Alias applications of small sizes are placed in the main storage apparatus.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
    a central processing unit to interpret and execute instructions of a program;
    a main storage apparatus; and
    a secondary storage apparatus or an interface connectable to a secondary storage apparatus;
    a main program stored on said main storage apparatus and executed under the control of an operating system incorporated in said information processing apparatus,
    wherein said main storage apparatus has a first program stored therein to support copying an application from said secondary storage apparatus to said main storage apparatus and to execute the application;
    a second program, including location or path information of the application and a starting code to start said first program, produced in said main storage apparatus by said first program; and
    after executing the application started by said first program, said first program deleting the application from said main storage apparatus.

2. An information processing apparatus according to claim 1, wherein said operating system cannot load the application on said secondary storage apparatus into said main storage apparatus and cause the application to be executed.

3. An information processing apparatus according to claim 1, wherein, when said second program is started, the starting code included in said second program is processed to start said first program, and then said first program copies the application on said second storage apparatus into said main storage apparatus based on the location or path information included in said second program and causes the application to be started.

4. An information processing apparatus according to claim 1, wherein said second program designates the location or path information included in said second program as an argument to start said first program.

5. An information processing apparatus according to claim 1, wherein, when the application is changed after being started, then the changed application is written back into said second storage apparatus before the application is deleted from said main storage apparatus by said first program.

6. A computer readable storage medium including program instructions for use with an information processing apparatus, which includes a central processing unit for interpreting and executing the instructions of the program, a main storage apparatus, and a secondary storage apparatus or an interface for connection to a secondary storage apparatus, for supporting copying an application from said secondary storage apparatus to said main storage apparatus and executing the application, said program causing said information processing apparatus to implement steps comprising:
    automatically producing, for each of the applications, a program including location or path information of the application and a starting code configured to start said program and to cause the produced program to exist in said main storage apparatus;
    processing the starting code included in the program to start said program, and then, using said program, copying the application on said second storage apparatus to said main storage apparatus based on the location or path information and causing the application to be started; and
    deleting, after executing the application, the application from said main storage apparatus.

7. The computer readable medium according to claim 6, further comprising, when the application is changed after being started, writing the changed application back to said second storage apparatus before the application is deleted from said main storage apparatus.

8. The information processing apparatus according to claim 1, wherein the first program deletes files related to the application including temporary files.

9. The computer readable medium accordion to claim 6, wherein the deleting includes deleting files related to the application including temporary files.

* * * * *